Oct. 20, 1953

T. S. TERRILL 2,656,105

LUMBER COUNTING AND COMPUTING DEVICE

Filed Oct. 28, 1949

INVENTOR.
THOMAS S. TERRILL,
BY
*Knight & Rodgers*
ATTORNEYS.

Oct. 20, 1953      T. S. TERRILL      2,656,105
LUMBER COUNTING AND COMPUTING DEVICE
Filed Oct. 28, 1949      3 Sheets-Sheet 2
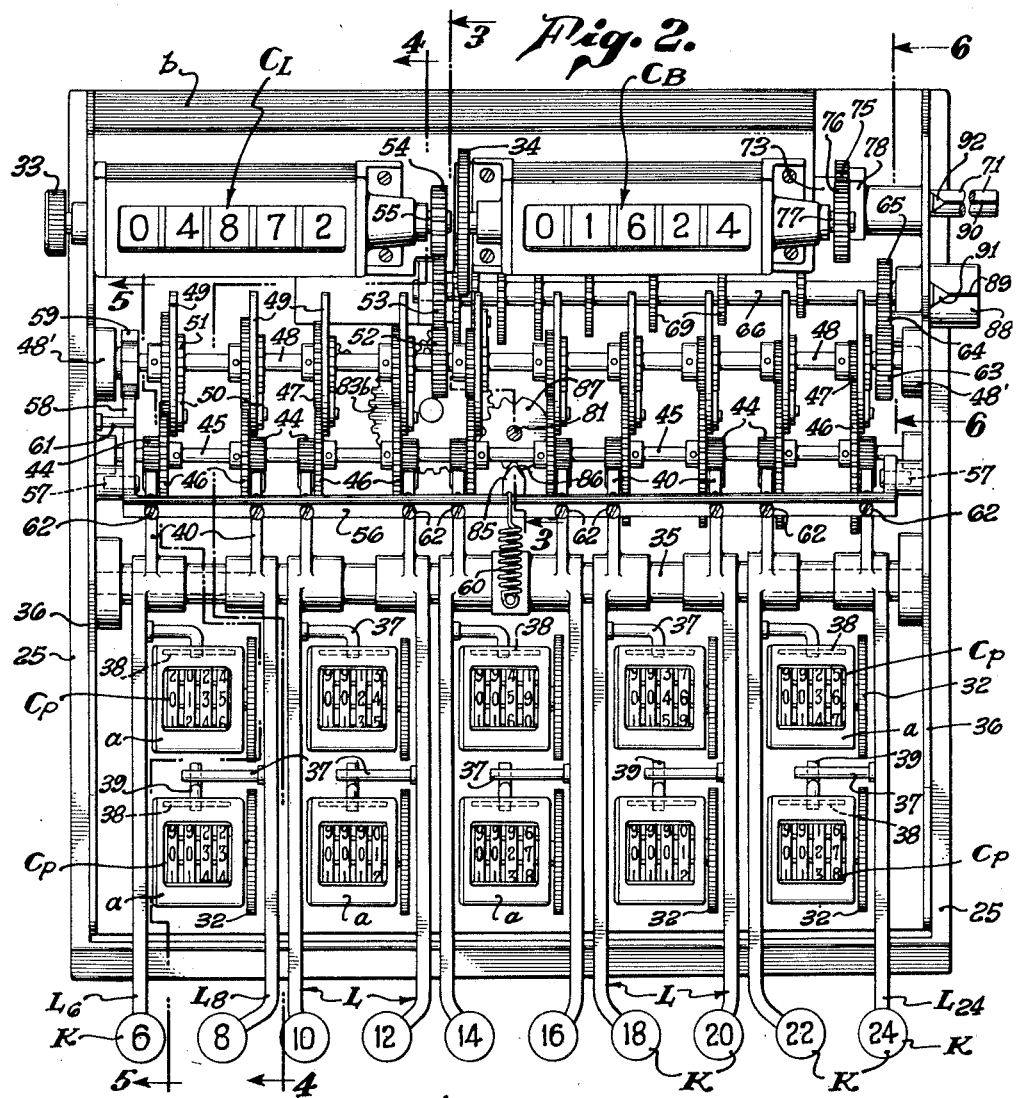
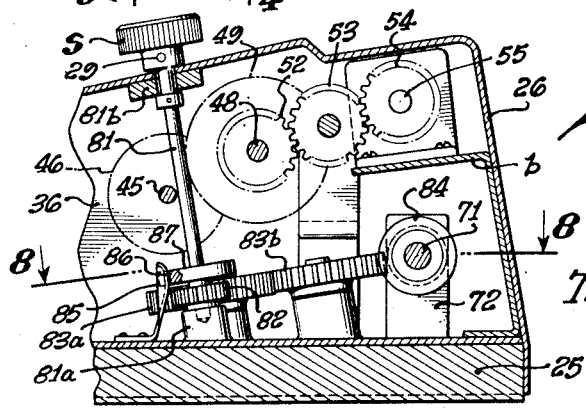
INVENTOR.
THOMAS S. TERRILL,
BY
ATTORNEYS.

Oct. 20, 1953  T. S. TERRILL  2,656,105
LUMBER COUNTING AND COMPUTING DEVICE
Filed Oct. 28, 1949  3 Sheets-Sheet 3
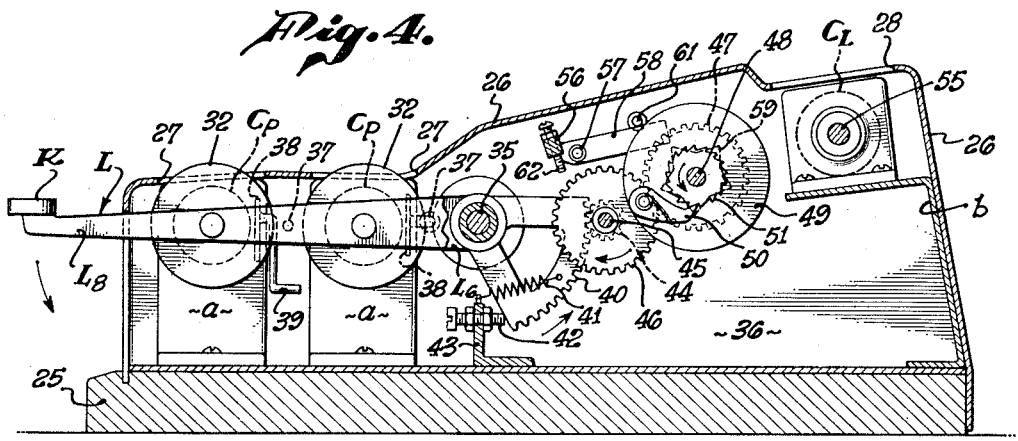
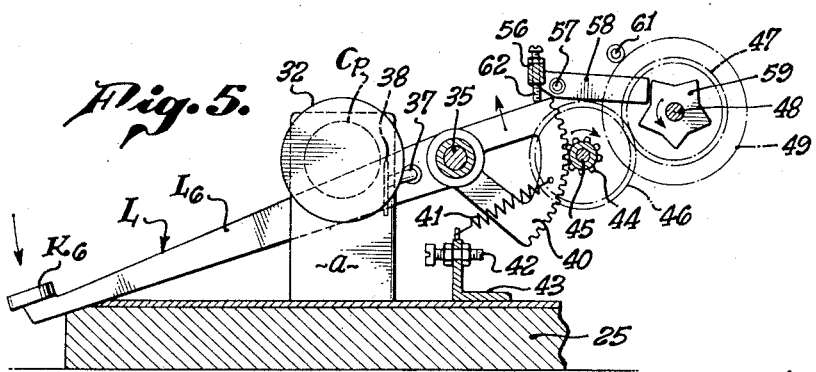
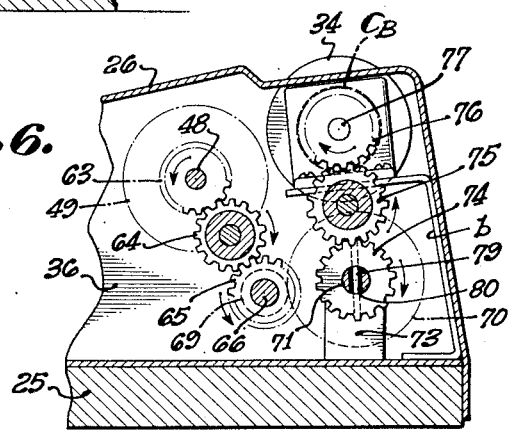
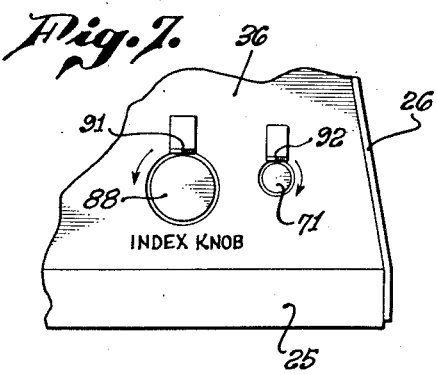
INVENTOR.
THOMAS S. TERRILL,
BY
ATTORNEYS.

Patented Oct. 20, 1953

2,656,105

UNITED STATES PATENT OFFICE 2,656,105

LUMBER COUNTING AND COMPUTING DEVICE

Thomas S. Terrill, Redding, Calif.

Application October 28, 1949, Serial No. 124,030

12 Claims. (Cl. 235—82)

This invention relates to counting and computing mechanisms and devices. More particularly it has to do with devices adapted to register a tally or count of a plurality of articles having a common factor, dimension, or dimensions but differing in another factor or dimension, also to compute and register certain totals relating to the dimensions of all of the articles counted. The invention is of use in making a count and computation of stock, of orders, or of shipments in connection with such commodities as lumber, metal pipe, metal bars for masonry reinforcement, structural members and shapes, et cetera.

For example in the lumber trade it is important to be able to ascertain quickly, with reference to a quantity or batch of lumber of a particular size or transverse dimensions, (1) the count of pieces of that size (transverse dimensions) but of different lengths; (2) the total length of all pieces counted and (3) the total board feet in all pieces counted. In the case of other similar commodities, such as pipe, metal rods, bars, girders, et cetera, which are sold by weight, total weight may be substituted for total board feet. In such instances it is to be noted that the dimensions in which the differences occur among the pieces, namely, length, is a factor in computing the total lineal footage, as well as the total board feet or the total weight as the case may be.

For convenience, the term "size" will be used herein to refer to the transverse dimensions or cross-sectional area of articles to be counted. One of the factors to be totalled, namely, lineal feet, is dependent only upon the number of pieces and the lengths thereof, while the other factor to be totalled, such as board feet in the case of lumber or weight in the case of other commodities such as pipe or other metal articles, is dependent upon size as well as the number and lengths of the pieces.

It is an object of the invention to provide a device or machine for registering a count of individual pieces of lumber, pipe, et cetera of the same size (transverse dimensions) but differing in length, and for simultaneously and automatically computing and registering the total length of all pieces counted, also the total board feet in the same (if the commodity is lumber) or total weight (if the commodity is of metal).

Another object is to devise a simple, compact and accurate mechanism for counting, computing and registering the required or desired data.

Still another object is to adapt the mechanism to give the same or similar data with references to pieces of differing size (transverse dimensions). Still other objects will be apparent from the detailed description which follows.

The counting and computing device of the present invention has a plurality of operating members or levers each having a key to be depressed, each key being numbered or otherwise marked to designate a different value of length of the articles (i. e. pieces of lumber, pipe, rod, et cetera) to be counted. There are a plurality of piece counters, one for each operating member or lever and actuated by the same, to tally and register the count of the articles or pieces corresponding to each operating member or lever. Mechanism actuated by the operating members or levers effects a computation of the total number of lineal feet in all the counted pieces and this total is registered on a first computer or lineal foot counter. Additional mechanism also actuated simultaneously by the operating members or levers computes the total number of board feet in the case of lumber (or weight in the case of metal pieces, or other desired data dependent upon or related to the size of the pieces), and such total is registered on a second computer or board foot counter (for lumber). A portion of the mechanism actuated by the operating members or levers is common to both computations. Size selecting mechanism conveniently operated by a size selector knob permits adjustment of the mechanism for the second computation when pieces of a different size (transverse dimensions) are to be counted.

In order to illustrate this invention and the manner of its use, one concrete embodiment thereof for tallying, computing and registering lumber is shown in the accompanying drawings, in which:

Fig. 2 is a similar plan view on a somewhat larger scale after the size selector knob and top cover have been removed;

Fig. 3 is a partial vertical sectional view on the broken line 3—3 of Fig. 1, section line 3—3 being also indicated in Fig. 2;

Fig. 4 is a vertical sectional view on the broken line 4—4 of Fig. 1, section line 4—4 being also shown on Fig. 2;

Fig. 5 is a partial vertical sectional view on the line 5—5 of Fig. 2 showing an operating lever depressed;

Fig. 6 is a partial vertical sectional view on the line 6—6 of Fig. 1, section line 6—6 being also indicated on Fig. 2;

Fig. 7 is a partial side elevation at line 7—7 of Fig. 1; and

Figures 1, 8:
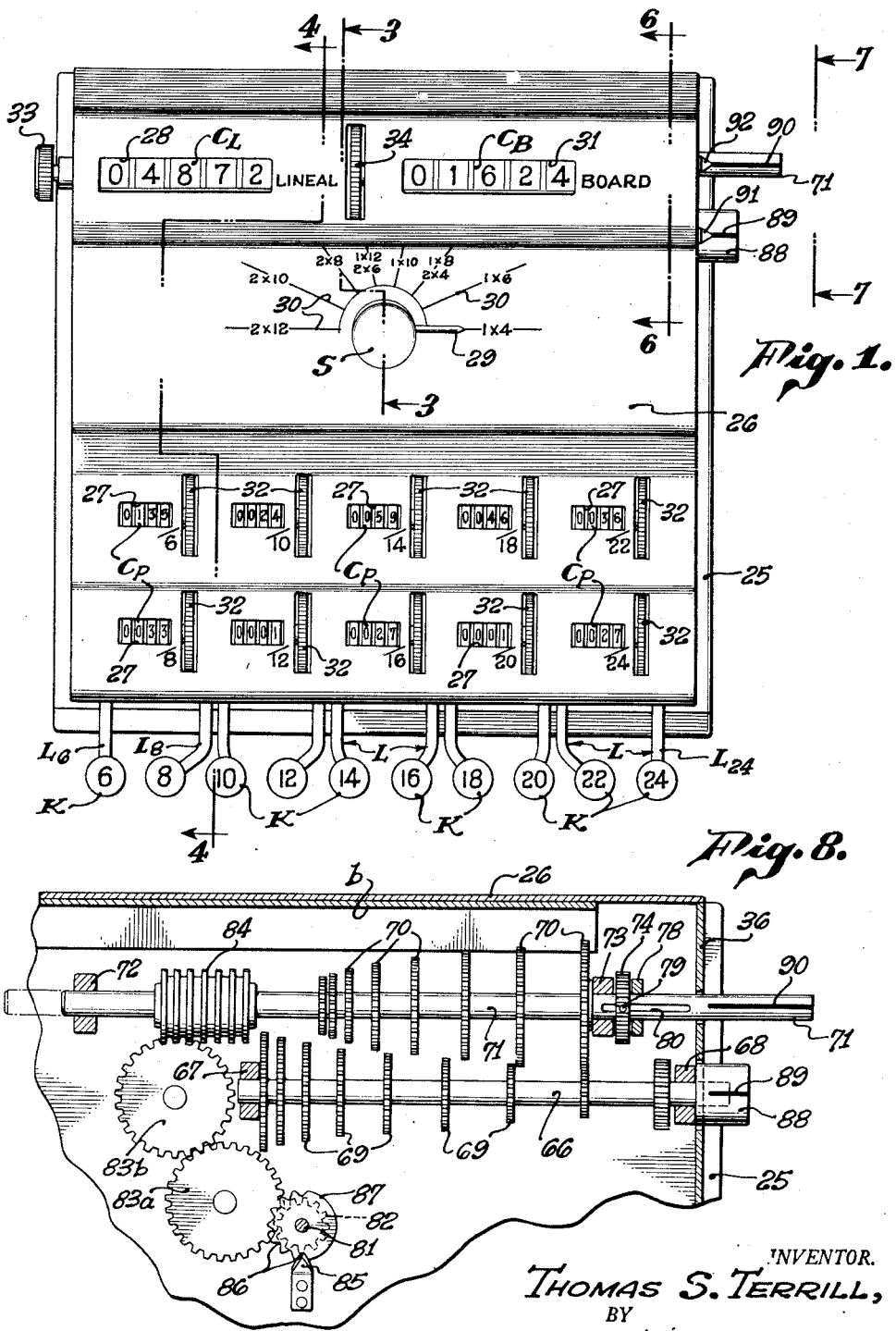
Fig. 1 is a plan view of the registering and computing machine.
Fig. 8 is a horizontal sectional view on the line 8—8 of Fig. 3.

As shown the machine has a base 25 of wood or other suitable material upon which the mechanism is mounted and enclosed by side walls 36 and a top cover 26 of sheet metal, fibre board, plastic or the like. From the front of the machine protrudes a series of operating levers L each having a key K bearing a number corresponding to the length in feet of the pieces of lumber which each lever is to count. In the machine shown there are ten such operating levers L with keys K marked respectively 6, 8, 10, 12, 14, 16, 18, 20, 22 and 24. For each key and lever there is a corresponding piece counter $C_P$. Hence there are ten piece counters, which are arranged in two banks of five each, the counters in the two banks being operated by alternately arranged levers. The piece counters $C_P$ are visible through openings 27 in the top cover 26. The length of pieces counted by each piece counter $C_P$ is designated by a number 6, 8, 10, 12, 14, 16, 18, 20, 22 or 24 on the top cover corresponding to the number on the key K of the lever L which actuates the counter, each of these length designating numbers being located adjacent the corresponding opening 27 as shown in Fig. 1. The total lineal feet of all the pieces of lumber tallied by the two banks of piece counters $C_P$ is computed and shown concurrently by a first computer or lineal foot counter $C_L$ visible through opening 28 in cover 26 at the left side of the rear of the machine. The legend "Lineal" may be placed on the cover adjacent the opening 28, as shown. In order to compute and show concurrently the total of board feet in the pieces of lumber tallied by the piece counters $C_P$, a size selector knob S is provided back of the piece counters having a pointer 29 which is manually adjustable by rotating knob S to register with any one of a series of size designating marks 30 on top cover 26. As shown, there are eight such marks with associated size designating legends on the cover, to indicate in inches different transverse dimensions of lumber, namely, 2 x 12, 2 x 10, 2 x 8, 1 x 12 or 2 x 6, 1 x 10, 1 x 8 or 2 x 4, 1 x 6, and 1 x 4. In Fig. 1 pointer 29 is shown in register with the size mark designating 1 x 4, to indicate that all the pieces of lumber being tallied on piece counters $C_P$ have transverse dimensions of 1 x 4 inches. The total number of board feet in all the pieces tallied is shown by a second computer or board foot counter $C_B$, visible through opening 31 in top cover 26 at the right side of the rear of the machine, as indicated by the legend "Board" adjacent said opening.

In using the machine the operator registers the count of the pieces of lumber by depressing the key K having the proper length designation for each piece of lumber. For example, to count a six foot piece he depresses key $K_6$ producing a downward stroke of the corresponding lever $L_6$, from the normal or rest position as shown in Fig. 4 to the depressed position shown in Fig. 5. Each downward stroke of an operating lever operates the associated piece counter $C_P$ to add a count of one. At the same time it adds a count of six to the first computer or lineal foot counter $C_L$, and also adds a count of two to the second computer or board foot counter $C_B$ when pointer 29 of size selector knob S registers with the mark 1 x 4 as shown in Fig. 1.

In Figs. 1 and 2 the counters indicate that the machine has been used to count or tally pieces of lumber 1 x 4 inches in transverse dimensions as follows:

135 pieces each 6 feet long
33 pieces each 8 feet long
24 pieces each 10 feet long
1 piece 12 feet long
59 pieces each 14 feet long
27 pieces each 16 feet long
46 pieces each 18 feet long
1 piece 20 feet long
36 pieces each 22 feet long
27 pieces each 24 feet long as shown by the individual piece counters $C_P$, and to compute the total lineal feet (4872 as shown by lineal foot counter $C_L$) and the total board feet (1624 as shown by board foot counter $C_B$) in all such pieces. At the end of one counting operation and in preparation for a new counting operation all the counters are preferably cleared by returning the same to zero. To this end each piece counter $C_P$ is provided with a clearing wheel 32, lineal foot counter $C_L$ has a clearing knob 33 and board foot counter $C_B$ a clearing wheel 34, for resetting or returning the respective counters to zero.

*Piece counting and lineal foot counting*

The several operating levers L are mounted for independent pivotal movement on a fixed shaft 35 (Figs. 2, 4 and 5) secured at its ends to side plates 36 extending upwardly from base 25. Each of these levers L is provided with a trip member 37 (Fig. 2) to operate its piece counter $C_P$ which is rigidly mounted on a support *a* secured to and extending upwardly from base 25 (Figs. 4 and 5). Each piece counter is of conventional construction and is operated to add a count of one on each downward stroke of a conventional actuating slide 38 which is forcibly depressed by the associated lever L and which automatically returns to its raised position upon upward movement of the lever. As shown in Figs. 2 and 4, the trip members 37 for the second or back row or bank of counters $C_P$ are attached to the actuating slides 38 on the counters, while the trip members 37 for the first or front bank of counters $C_P$ engage arms 39 depending from actuating slides 38 as levers L approach the end of their downward stroke. Rearwardly of fixed shaft 35 each of the operating levers L is provided with a gear segment 40 (Figs. 2, 4 and 5) and with a spring 41 for returning it to normal rest position against an adjustable stop 42 mounted on an angle member 43 extending transversely across the machine. Downward movement of the levers is limited by engagement with the base 25 or with other suitable stop means, so that all the levers have the same length of stroke.

Each downward stroke on a lever L by pressure on its key K not only operates the corresponding piece counter to add a count of one, but also operates through gear segment 40 to rotate an associated small pinion 44 on a fixed shaft 45 whose ends are secured to side plates 36. In the particular machine shown, a full downward stroke of any one of the levers L rotates the corresponding pinion 44 one-half a revolution in a clockwise direction. The pinions 44 corresponding to the several operating levers L are mounted for independent rotation on fixed shaft 45, and a large gear 46 is secured to each pinion for rotation therewith. Each gear 46 is in mesh with an associated gear 47 loosely mounted for independent rotation on a ratchet shaft 48, the ratios of the respective pairs of gears 46 and 47 being proportional to the lengths of the pieces of lumber designated for the several operating levers L and indicated on the keys K; for example, a ratio of 1.2:1 for the gears corresponding to the 6 foot piece lever L6, 1.6:1 for those corresponding to the 8 foot piece lever L8, and proportional ratios up to and including 4.8:1 for the gears corresponding to the 24 foot piece lever L24.

The ratchet shaft 48 is rotatably journalled in bearings 48' on side plates 36. The rotation of each gear 47 is transmitted to the ratchet shaft 48 by means of a pawl carried in the form of a disk 49 secured to or integral with each gear 47, each disk 49 having a spring pressed pawl 50 engaging a ratchet wheel 51 secured to shaft 48. The pawl and ratchet arrangement 50, 51 enables an actuated gear train 46, 47 to impart rotative movement to ratchet shaft 48 in a counter-clockwise direction in Fig. 4 during downward movement of any one of operating levers L, and then permits the actuated gear train 46, 47 to return to its normal rest position during the upward movement of the operating lever L. During the rotation of shaft 48 by the pawl and ratchet means corresponding to the actuated lever L, the other ratchet wheels on said shaft pass freely beneath their associated pawls. During the return of any actuated gear train 46, 47 and the associated pawl 50 to its normal rest position, the other pawls 50 engage their respective ratchet wheels 51 to prevent reverse rotation of shaft 48.

The counter-clockwise rotation of ratchet shaft 48 operates through a train of three gears 52, 53 and 54 (Figs. 2 and 3) to actuate the lineal foot counter CL mounted on support b (Fig. 4) above base 25. Each complete counter-clockwise revolution of ratchet shaft 48 effects a complete counterclockwise revolution of the shaft 55 of the first computer or lineal foot counter CL and adds a count of ten on the latter. Thus the shaft 48 constitutes a main or common operating shaft for the counter CL. Hence, each operation of operating lever L6 produces 0.6 revolution of lineal foot counter shaft 55 adding a count of six; each operation of operating lever L8 adds a count of eight, and so on up to lever L24, which produces 2.4 revolutions of shaft 55 on each operation, adding a count of twenty-four, with the result that the lineal foot counter CL accurately registers the total lineal feet of all the pieces of lumber counted.

In order to prevent accidental over-running of lineal foot counter CL, means are provided positively to stop ratchet shaft 48 against further turning movement when any one of operating levers L completes its downward stroke. The stop means shown comprise a lock bar 56 (Figs. 2, 4 and 5) extending transversely across the machine and pivotally mounted at 57 on side plates 36. Bar 56 is contacted by the top of gear segment 40 of each of the operating levers L at the end of the downward stroke of the lever to bring an arm 58 on lock bar 56 into locking position with respect to a notched or star wheel 59 secured to ratchet shaft 48, as shown in Fig. 5. A spring 60 (Fig. 2) engaging lock bar 56 normally holds lock bar arm 58 out of locking position and against a fixed stop 61 (Fig. 4), and returns it to this nonlocking position upon upward movement of the depressed lever. Lock bar 56 preferably has a plurality of adjustable contact members 62 to be engaged by the individual gear segments 40 of the respective operating levers L.

Board foot counting

The rotation of ratchet shaft 48 also serves to actuate the second computer or board foot counter CB (also mounted on support b as shown in Fig. 6) through mechanism which will now be described. A train of three gears 63, 64 and 65 (Figs. 2 and 6) transmits the counter-clockwise rotation of ratchet shaft 48 to a transfer shaft 66 (Figs. 2, 6 and 8) mounted rotatably in bearings 67 and 68 and having eight gears 69 thereon, each of which is adapted to mesh with a corresponding gear 70, of which there are eight on a slidable change-speed shaft 71 as shown in Fig. 8. Shaft 71 is slidably mounted in bearings 72 and 73 so as selectively to mesh each gear 70 with its corresponding gear 69 on shaft 66, and the corresponding gears 70 and 69 are so mounted on their respective shafts that only one set of gears can be in mesh in any permissible position of slidable shaft 71. A train of three gears 74, 75, 76 (Fig. 6) transmits the rotation of change speed shaft 71 to shaft 77 of board foot counter CB. To permit sliding movement of shaft 71 while gear 74 of the gear train retains a fixed position longitudinally of the shaft in meshing engagement with gear 75, gear 74 is mounted loosely on shaft 71 between bearing 73 and a retainer 78 (Fig. 8) and has a pin 79 which extends through an elongated slot 80 in shaft 71 (Figs. 6 and 8) so as to key gear 74 to said shaft.

Board foot counter CB is arranged to add a count of ten for each complete clockwise revolution of its shaft 77 (Fig. 6) and the ratios of the various pairs of meshable gears 69 and 70 are proportional to the different sizes (cross sectional areas) of the pieces of lumber to be counted, which sizes are designated by marks 30 on top cover 26 (Fig. 1). In the particular machine shown, one revolution of shaft 48 counterclockwise in Fig. 6 produces one revolution of transfer shaft 66 in the same direction; this in turn produces clockwise rotation of change speed shaft 71 through an angle dependent upon the gear ratio of the meshing pair of gears 69 and 70; and each clockwise revolution of shaft 71 produces one clockwise revolution of shaft 77 of counter CB. On rotating size selector knob S to bring pointer 29 into register with one of the size designating marks 30, shaft 71 will be moved by means described below to bring the proper pair of gears 69, 70 into mesh so that the second computer or board foot counter CB will accurately compute and register the total board feet of all the pieces of lumber counted.

Size selector knob S is secured to the upper end of a shaft 81 which is rotatably mounted in bearings 81a and 81b and projects above the cover 26. Rotation of size selector knob S operates through its shaft 81, gear 82 thereon, gears 83a and 83b, and a cylindrical rack 84 secured to shaft 71 and meshing with gear 83b (Figs. 3 and 8) to shift the shaft 71 to bring the proper gear 70 into mesh with its corresponding gear 69 on transfer shaft 66. The size selector knob S and the slidable shaft 71 are releasably held in any selected position by engagement of a spring latch 85 with a corresponding notch 86 in a positioning wheel 87 secured to size selector shaft 81 immediately above gear 82 (Figs. 3 and 8). As shown in Fig. 8 positioning wheel 87 has eight notches 86 corresponding to the eight size designating markers 30 on top cover 26 (Fig. 1)

and to the eight pairs of change speed gears 69, 70 on shafts 66 and 71 respectively.

To permit longitudinal shifting of slidable shaft 71, the two shafts 66 and 71 are rotated to predetermined positions in which the change speed gears 69, 70 thereon are properly aligned for moving into and out of mesh with each other. For this purpose both shafts 66 and 71 project through and beyond right side plate 36 (Figs. 1, 2, 7 and 8) and the projecting end of transfer shaft 66 has an index knob 88 secured thereto having an index mark 89 thereon. The projecting end of slidable shaft 71 has a similar index mark 90. When the shafts are rotated by manual rotation of knob 88 in a counterclockwise direction in Fig. 7, to bring the index marks on both shafts into register with fixed index pointers 91 and 92 respectively on side plate 36, as shown in Figs. 1 and 2, the shafts are in the predetermined position for shifting gears. The amount of rotation of index knob 88 necessary to bring index marks 89 and 90 into register with their respective fixed index pointers 91 and 92 will depend upon the initial relative rotative positions of shafts 66 and 71 and upon the pair of gears 69, 70 which happened to be in mesh when a change in the setting of the size selector knob is desired.

This manual rotation of these shafts will operate both of the computers $C_L$ and $C_B$, producing a "false" count dependent upon the amount of rotation required. Consequently, this operation should not be carried out following the use of the machine to tally and register a given batch of lumber, until after the total counts indicated by these computers have been noted. This "false" count will then be of no effect, since the computers are ordinarily reset to zero after adjusting the size selector mechanism to a different size. However, if it should be desired to continue operation of the machine after changing the adjustment of the size selector mechanism and without resetting the computers $C_L$ and $C_B$ to zero, this may be done provided proper allowance is made for this "false" count, as by noting the amount of the count thus added to each of these computers and deducting this amount from the subsequent indications of lineal feet and board feet, respectively. During this manual rotation of shafts 66 and 71, the ratchet shaft 48 is also rotated counterclockwise, but the ratchet wheels 51 slip past their respective spring-pressed pawls 50 so that this adjustment has no effect upon any of the mechanism interconnecting these pawls with their respective operating levers L or upon the piece counters $C_P$.

In the drawings the parts are shown in position for tallying and measuring 1" x 4" pieces of lumber, size selector knob S having its pointer 29 in register with the appropriate mark 30 in Fig. 1. In this position the right hand pair of gears 69, 70 on shafts 66 and 71 are in mesh with each other (Fig. 8), and the ratio of these two gears is 1:3, corresponding to ⅓ of a board foot for each foot of lineal measurement in this size of lumber. In this adjustment of parts, board foot counter $C_B$ will compute and register the board feet of all 1" x 4" pieces counted, and while thus adjusted the machine can only be used for computing and registering board feet of pieces of this particular size.

If it is desired to count pieces of a different size, index knob 88 on shaft 66 is turned to bring marks 89 and 90 into register with index pointers 91 and 92 respectively, whereupon size selector knob S can be turned and set at a different size marking 30. For example, if pointer 29 on size selector knob S is moved to the position marked 2" x 12", the machine may be used to tally and to compute total lineal and board feet measurements of pieces of that size. In that case the extreme left hand gear 70 will be brought into mesh with the extreme left hand gear 69, these gears having a ratio of 2:1, corresponding to the two board feet in each lineal foot of 2" x 12" lumber. The ratios of the other pairs of gears 69, 70 are likewise equal to the number of board feet in each lineal foot of the different sizes of lumber as designated by the corresponding size selector marks 30.

From the above it will be apparent that the counting and computing device of the present invention is simple and easy to operate and requires little effort and attention on the part of an operator. After a tally has been made of all the pieces of one size (transverse dimensions) he has only to read off the counters to have all the pertinent information which he needs, namely, the number of pieces of each length as indicated by the respective piece counters $C_P$, the total lineal footage as indicated by the lineal foot counter $C_L$, and the total board feet in all the pieces counted as indicated by the board foot counter $C_B$. On turning the counters back to zero he is ready to tally another batch. If the new batch is of a different size (transverse dimensions) he turns the size selector knob S to the proper size, after lining up marks 89 and 90 with index pointers 91 and 92 if necessary.

It is generally desired to make such a count or tally of the number of pieces, the total lineal feet, and total board feet, only for a batch of pieces of a given size (transverse dimensions) but of different lengths, and it is therefore generally practicable and desirable to reset all the counters to zero before counting a batch of a different size. However, if desired in any particular case, the operator can use the device first to make such a count of a batch of one size and note the indicated count of pieces, lineal feet and board feet, then adjust size selector knob S to a different size and continue the tally for that size, without resetting the counters to zero, provided proper allowance is made for deducting the "false" count of lineal feet and board feet occasioned by manual operation of index knob 88 incident to the size selecting adjustment, as described above.

It will be further apparent that the mechanism and the principle of the computing device of the present invention are adaptable to tally, to obtain, and to register comparable data in respect to other articles and in other industries and trades. For example, the device may be adapted for counting pieces of metal pipe of any one of a plurality of different sizes, in order to register the number of pieces of each length, the total lineal feet of all the pieces, and the total weight of all the pieces. For that purpose, the ratios of the respective pairs of selectively meshable gears 69 and 70 may be made proportional to the weight per lineal foot of different sizes of pipe, and the ratios of these gears and the other gear mechanism interconnecting the ratchet shaft 48 and the shaft 77 of the second computer $C_B$ may be made such that this second computer will register directly a count of the total weight of all the pieces counted. It will be evident that the piece counting and lineal foot counting mechanisms may be used for counting articles of any kind, and that by changing the ratios of the respective pairs of gears 46 and 47 the devise may be adapted for computing the total lineal feet of pieces of any desired lengths. Accordingly it is to be understood that my invention is not limited to the exact form shown nor to the specific details thereof but covers all changes, modifications and adaptations within the scope of the appended claims.

I claim:

1. In counting and computing mechanism for pieces of lumber and the like: an operating member; a counter actuated by said member for registering a tally of the number of times said member is operated to count a number of articles having the same length and transverse dimensions; a first computer for registering the total length of said articles; a second computer for registering the total of a factor dependent upon the length and transverse dimensions of said articles; means actuated by said member for operating said first computer to register a predetermined increment of length upon each operation of said member; additional means including adjustable transmission means, actuated by said member for operating said second computer to register a predetermined increment of said factor upon each operation of said member; and selective control means for adjusting said adjustable transmission means to vary the predetermined increment of said factor registered by said second computer upon each operation of said member and thereby adapt the mechanism to count another group of articles of different transverse dimensions and to register the total length and the total of said factor for such other group of articles.

2. In counting and computing mechanism for pieces of lumber and the like: an operating member; a counter actuated by said member for registering a tally of the number of times said member is operated to count a number of articles having the same length and transverse dimensions; a first computer for registering the total length of said articles; a second computer for registering the total of a factor dependent upon the length and transverse dimensions of said articles; means actuated by said member for automatically operating both said first and second computers; and means comprising change speed gearing and selective control means therefor to adjust the operating means for said second computer to adapt the mechanism to count and to give totals of another group of articles of different transverse dimensions.

3. In a counting and computing machine for pieces of lumber and the like having different lengths but having the same transverse dimensions: a series of operating members, one operating member for each of said lengths; a counter for each member actuated by the latter to register a tally of the number of times said member is operated to count articles of the corresponding length; a first computer common to all of said members for registering the total length of all articles counted; a second computer common to all of said members for registering the total of a factor dependent upon the length and transverse dimensions of all articles counted; an operating connection between each of said members and said first computer to actuate the latter directly and proportionately to the length corresponding to that member; and an operating connection between each of said members and said second computer to actuate the latter proportionately to the length corresponding to that member and proportionately to the transverse dimensions of the pieces.

4. In a counting and computing device for pieces of lumber having the same transverse dimensions but differing in length: a series of operating members, one for each length of piece; a counter actuated by each member for registering a tally of the number of times said member is operated to count pieces of the same length; a first computer common to all of said members; means actuated directly and proportionately by each of said members to cause said first computer to register the total length of all the pieces counted; a second computer common to all of said members; means actuated by each of said members to cause said second computer to register the total number of board feet in all the pieces counted; and means comprising change speed gearing for adjusting said last named means to cause said second computer to register the total number of board feet in pieces of different transverse dimensions.

5. In registering and computing mechanism for lumber and the like: a series of operating levers for counting articles differing from one another in length; a counter for each lever to register the number of times each lever is operated; a rotatable shaft; means interposed between said shaft and each of said levers and actuated by the latter to rotate said shaft proportionately to the length of the article counted by each of said levers; said means comprising a gear segment on each lever and a pawl and ratchet arrangement on said rotatable shaft for each lever; a first computer common to all of said levers and driven by said shaft for registering the total length of all the articles counted; a second computer common to all of said levers and also driven by said shaft for registering the total of a factor dependent upon the length and transverse dimensions of all the articles counted; and means for selectively modifying the driving connection between said shaft and said second computer to vary the operation of said second computer produced by a given rotative movement of said shaft in accordance with variations in the transverse dimensions of the articles to be counted.

6. In registering and computing mechanism for lumber and the like: a series of operating levers for counting articles differing from one another in length; a counter for each lever to register the number of times each lever is operated; a rotatable shaft; means interposed between said shaft and each of said levers and actuated by the latter to rotate said shaft proportionately to the length of the article counted by each of said levers; said means comprising a gear segment on each lever and a pawl and ratchet arrangement on said rotatable shaft for each lever; a first computer driven by said shaft for registering the total length of all the articles counted; a second computer also driven by said shaft for registering the total of a factor dependent upon the length and transverse dimensions of all the articles counted; and means for selectively modifying the driving connection between said shaft and said second computer to conform to changes in the transverse dimensions of the articles to be counted; said last named means comprising a transfer shaft and a movable shaft adjacent thereto, pairs of meshable gears in spaced relation to one another on said last named shafts, said movable shaft being slidable relative to said transfer shaft selectively to mesh the various pairs of gears, and a selector knob for adjusting the position of said movable shaft.

7. In registering and computing mechanism for lumber and the like: a series of operating levers for counting articles differing from one another in length; a counter for each lever to register the number of times each lever is operated; a rotatable shaft; means interposed between said shaft and each of said levers and actuated by the latter to rotate said shaft proportionately to the length of the article counted by each of said levers; said means comprising a gear segment on each lever and a pawl and ratchet arrangement on said rotatable shaft for each lever; a first computer driven by said shaft for registering the total length of all the articles counted; a second computer also driven by said shaft for registering the total of a factor dependent upon the length and transverse dimensions of all the articles counted; and means for selectively modifying the driving connection between said shaft and said second computer to conform to changes in the transverse dimensions of the articles to be counted; said last named means comprising a transfer shaft and a movable shaft adjacent thereto, pairs of meshable gears in spaced relation to one another on said last named shafts, said movable shaft being slidable relative to said transfer shaft selectively to mesh the various pairs of gears, a cylindrical rack on said slidable shaft, a gear in mesh with said rack, a selector for actuating said last named gear to control the position of said slidable shaft, and a spring retainer for releasably holding said selector in predetermined positions in which the various pairs of meshable gears are in mesh.

8. In registering and computing mechanism for lumber and the like: a series of operating levers for counting articles differing from one another in length; a counter for each lever to register the number of times each lever is operated; a rotatable shaft; means interposed between said shaft and each of said levers and actuated by the latter to rotate said shaft proportionately to the length of the article counted by each of said levers; said means comprising a gear segment on each lever and a pawl and ratchet arrangement on said rotatable shaft for each lever; a first computer driven by said shaft for registering the total length of all the articles counted; a second computer also driven by said shaft for registering the total of a factor dependent upon the length and transverse dimensions of all the articles counted; means for selectively modifying the driving connection between said shaft and said second computer to conform to changes in the transverse dimensions of the articles to be counted; said last named means comprising a transfer shaft driven by the first mentioned shaft, a slidable shaft in spaced relation to said transfer shaft and geared to said second computer, pairs of meshable gears on said transfer shaft and on said slidable shaft adapted to be engaged selectively by movement of said slidable shaft, and a selector for controlling the position of said movable shaft; and means for manually rotating said transfer shaft to dispose said transfer shaft and said slidable shaft in proper relative positions to enable said selector to move said slidable shaft and bring different pairs of said meshable gears into mesh.

9. In registering and computing apparatus for articles differing from one another in length: a series of operating levers mounted for independent pivotal movement on a fixed shaft, one lever for each length of said articles, each lever having a gear segment; a second fixed shaft; pinions rotatable on said second shaft in mesh with said gear segments; a rotatable shaft; ratchet wheels secured to said rotatable shaft; gears and associated disks loosely mounted on said rotatable shaft, said disks carrying pawls to engage said ratchet wheels; gears associated with said pinions in mesh with said gears on said rotatable shaft; the ratios of said gears associated with the pinions to the gears on the rotatable shaft being proportioned to the different lengths represented by said levers; and a computer driven by said rotatable shaft for registering the total length of all the articles counted by actuation of said operating levers.

10. In registering and computing apparatus for articles differing from one another in length: a series of operating levers mounted for independent pivotal movement on a fixed shaft, one lever for each length of said articles, each lever having a gear segment; a second fixed shaft; pinions rotatable on said second shaft in mesh with said gear segments; a rotatable shaft; ratchet wheels secured to said rotatable shaft; gears, and associated disks loosely mounted on said rotatable shaft, said disks carrying pawls to engage said ratchet wheels; gears associated with said pinions in mesh with said gears on said rotatable shaft; the ratios of said gears associated with the pinions to the gears on the rotatable shaft being proportioned to the defferent lengths represented by said levers; a computer driven by said rotatable shaft for registering the total length of all the articles counted by actuation of said operating levers, and means to prevent overrun of said rotatable shaft comprising locking means actuated by each of said operating levers at the end of its stroke for positively stopping the rotation of said rotatable shaft.

11. In registering and computing apparatus for articles differing from one another in length: a series of operating levers mounted for independent pivotal movement on a fixed shaft, one lever for each length of said articles, each lever having a gear segment; a second fixed shaft; pinions rotatable on said second shaft in mesh with said gear segments; a rotatable shaft; ratchet wheels secured to said rotatable shaft; gears and associated disks loosely mounted on said rotatable shaft, said disks carrying pawls to engage said ratchet wheels; gears associated with said pinions in mesh with said gears on said rotatable shaft; the ratios of said gears associated with the pinions to the gears on the rotatable shaft being proportioned to the different lengths represented by said levers; a computer driven by said rotatable shaft for registering the total length of all the articles counted by actuation of said operating levers; a second computer for registering the total of a factor dependent upon the length and transverse dimensions of all the articles counted; and an operating connection between said rotatable shaft and said second computer comprising change speed gearing and selector control means therefor to permit adjustment of said last named operating connection for changes in transverse dimensions of the articles.

12. In registering and computing apparatus for articles differing from one another in length: a series of operating levers mounted for independent pivotal movement on a fixed shaft, one lever for each length of said articles, each lever having a gear segment; a second fixed shaft; pinions rotatable on said second shaft in mesh with said gear segments; a rotatable shaft; ratchet wheels secured to said rotatable shaft; gears and associated disks loosely mounted on said rotatable shaft, said disks carrying pawls to engage said ratchet wheels; gears associated with said pinions in mesh with said gears on said rotatable shaft; the ratios of said gears associated with the pinions to the gears on the rotatable shaft being proportioned to the different lengths represented by said levers; means to prevent overrun of said rotatable shaft comprising locking means actuated by each of said operating levers at the end of its stroke for positively stopping the rotation of said rotatable shaft; a computer driven by said rotatable shaft for registering the total length of all the articles counted by actuation of said operating levers; a second computer for registering the total of a factor dependent upon the length and transverse dimensions of all the articles counted; and an operating connection between said rotatable shaft and said second computer comprising change speed gearing and selector control means therefor to permit adjustment of said last named operating connection for changes in transverse dimensions of the articles.

THOMAS S. TERRILL.

References Cited in the file of this patent

UNITED STATES PATENTS

| Number | Name | Date |
|---|---|---|
| 544,360 | Labofish | Aug. 13, 1895 |
| 984,908 | Haley et al. | Feb. 21, 1911 |
| 1,013,030 | Lowery | Dec. 26, 1911 |
| 1,057,637 | Haley et al. | Apr. 1, 1913 |
| 1,202,728 | Heberling et al. | Oct. 24, 1916 |
| 1,274,412 | Haley et al. | Aug. 6, 1918 |
| 1,924,278 | Green | Aug. 29, 1933 |
| 2,033,087 | Avery | Mar. 3, 1936 |
| 2,540,624 | Le Blanc | Feb. 6, 1951 |